United States Patent [19]

Suda et al.

[11] Patent Number: 4,762,986
[45] Date of Patent: Aug. 9, 1988

[54] AUTOMATIC FOCUSSING SYSTEM INCLUDING IN-FOCUS POSITION PREDICTION MEANS

[75] Inventors: Hirofumi Suda; Naoya Kaneda, both of Kanagawa; Susumu Kozuki, Tokyo, all of Japan

[73] Assignee: Canon Kabushiki Kaisha, Tokyo, Japan

[21] Appl. No.: 22,740

[22] Filed: Mar. 6, 1987

[51] Int. Cl.[4] .......................... H04N 3/26; G03B 3/00
[52] U.S. Cl. .................................... 250/201; 358/227; 354/402
[58] Field of Search ...... 250/201 R, 201 AF, 201 PF, 250/201 DF, 204; 358/227; 354/402, 408

[56] References Cited

U.S. PATENT DOCUMENTS

| 4,320,417 | 3/1982 | Hanma et al. | 358/227 |
| 4,333,007 | 6/1982 | Langlais et al. | 250/204 |
| 4,392,726 | 7/1983 | Kimura | 354/402 |
| 4,422,097 | 12/1983 | Inuiya | 358/227 |
| 4,531,158 | 7/1985 | Murakami et al. | 358/227 |
| 4,687,915 | 8/1987 | Sakai et al. | 250/204 |

FOREIGN PATENT DOCUMENTS 61-54152  3/1985  Japan .
61-13776  1/1986  Japan .

Primary Examiner—David C. Nelms
Assistant Examiner—Charles Wieland
Attorney, Agent, or Firm—Robin, Blecker & Daley

[57] ABSTRACT

An automatic focussing system is disclosed which comprises an output circuit for sequentially outputting signals corresponding to a focus condition in a predetermined period, a prediction circuit for predicting a focus point by use of at least three signals outputted from the output circuit and a control circuit for controlling focus on the basis of the result of prediction by the prediction circuit when the difference of two signal outputs outputted from the output circuit is below a predetermined value and when the levels of signals satisfy a predetermined condition. The automatic focussing system further includes a detection circuit for detecting lens information of a photographic lens and a correction circuit for correcting the predicted value by the prediction circuit in accordance with the lens information obtained by the detection circuit. Furthermore, the automatic focussing system includes inhibition means for inhibiting focus control on the basis of the predicted values when at least one of the maximum level and timing of the predicted values changes beyond an allowable range with respect to the previous predicted values.

32 Claims, 9 Drawing Sheets

FROM CONTROL CKT 30

AUTOMATIC FOCUSSING SYSTEM INCLUDING IN-FOCUS POSITION PREDICTION MEANS

BACKGROUND OF THE INVENTION

1. Field of the Invention

This invention relates generally to an automatic focussing system, and more particularly to an automatic focussing (hereinafter called "AF") system suitable for those AF system apparatuses which effect automatic focus detection by utilizing video signals (image pickup video signals) outputted from a video camera.

2. Description of the Related Art

As an AF system which makes the most of the characterizing features of video cameras, a so-called "mountain climbing servo system" AF system which detects fineness of a picture surface by high band components in video signals, drives a focussing lens so as that the fineness attains maximum, and automatically adjusts an optical focus of the television camera has been drawing an increasing attention in recent years. This mountain climbing servo system (hereinafter called the "mountain climbing system") is described in detail in, for example, "NHK Technical Research", 1965, Vol. 17, No. 1, Series No. 86, pp. 21-37. The content of this system will be explained briefly with reference to FIG. 12 of the accompanying drawings which is a structural view of an automatic focussing system by the conventional mountain climbing system and FIG. 13 which shows the operation characteristics of the apparatus.

First of all, the rays of light from an object 1 which are incident through a focussing lens 2 form an image on photoelectric conversion means 3 and outputted as electric signals. The output signal as a video signal outputted from the photoelectric conversion means is inputted to a processing circuit 5 for a video camera through an amplifier 4 and at the same time, only high band components in the video signal are extracted by a band-pass filter (BPF) 6 juxtaposed with the processing circuit 5 at a next stage of the amplifier 4. The high band components are inputted to a gate circuit 7 of a next stage.

A window pulse forming circuit (WINDOW) 8 generates a sync pulse of only a predetermined region of one picture surface, such as only of the center of the picture surface or in other words, a so-called "window pulse", from the horizontal and vertical sync signals HD and VD separated by the processing circuit 5 for the camera described above, and the resulting window pulse is inputted to the gate circuit 7 described above in order to extract and output the signal of the high band component only during the generation period of this window pulse. The signal of the high band component outputted from the gate circuit 7 is further processed by a detector (DET) 9 and an integrator 10.

FIG. 13 shows the relationship between a voltage corresponding to the output of this integrator 10 (hereinafter called a "focal voltage") and the focal length of the lens 2. Since this focal voltage correspond to the fineness of the image which is picked up, the focal voltage becomes maximal if the position of a range ring (focus ring) for moving and adjusting the position of the focussing lens 2 is in correct agreement with the actual distance between the lens 2 and the object 1, and drops as the position deviates from this position C where the focal voltage is maximal.

Therefore, as can be seen from FIG. 13, automatic focussing can be attained by controlling the position of the lens range ring by any control means in such a manner as to climb the mountain of the focal voltage and guiding the lens range ring to the top of the mountain where the focal voltage is maximal. One of the known control means for accomplishing this object holds the output of the integrator 10 for each field of the video signal, compares the value held previously with the value held this time for each field and drives the lens range ring in a direction where the value is great. In other words, as shown in a mountain climbing circuit 16 encompassed by dash line in FIG. 12, sample pulses are generated at a predetermined timing by a monomultiple vibrator (MM) 12 and a sample pulse generation circuit (S.P) from the vertical sync signal VD separated by the camera processing circuit 5 described already, and the output of the integrator which is inputted to a sample-hold circuit (S/H) 11 is sampled and held in accordance with this sample pulse for each field. Furthermore, the output of the sample-hold circuit 11 is divided into two signals. One is as such applied to a comparator 15 while the other is applied to the comparator 15 after being delayed by one field by a one-field delay circuit (one-field delay) 14. The comparator 15 determins the difference between them, that is, the output of the integrator of the previous holding operation with that of the holding operation this time.

Suppose that the focal voltage of the output of the integrator 10 is at the level A in the previous field as shown in FIG. 13 and at the level B in a next field, the focal voltages A and B have the relation B>A and hence the comparator 15 outputs a high level control signal, for example, to a motor driving circuit (DRIVER) 17 in order to drive a motor (Mo) 18 while keeping the existing driving direction. As the motor 18 is thus operated, the lens 2 is moved in a focussing direction. Suppose the focal voltage is found to be at the level C shown in FIG. 13 by detection in the next field, the levels C and B have the relation C>B so that the signal level from the comparator 15 does not change and the motor 18 keeps operating in the same direction.

It will be assumed at this time that the maximum point of the focal voltage is at the level C as shown in FIG. 13. Then, if the lens range ring is kept moved as such in the same direction by the motor 18, it moves away from the focussing state C and the focal voltage tends to drop. As a result, a focal voltage of the level D is outputted in the next field and since D<C, the comparator 15 outputs a low level signal to the control circuit 17. Receiving this low level signal, the control circuit 17 generates a control signal which rotates reversely the motor 18 and the lens range ring is again sent reversely in the focussing direction.

As described above, the conventional mountain climbing system shown in FIGS. 12 and 13 keeps the rotating direction of the motor 18 as such to continue mountain climbing when the output of the mountain climbing circuit 16 consisting of the comparator 15 and the like is positive (high level), that is, when the focal voltage is in the increasing direction with the passage of time, and rotates reversely the motor 18 to climb the mountain when the output of the mountain climbing circuit is negative (low level), that is, when the focal voltage is in the decreasing direction with the passage of time. Therefore, mountain climbing is made on the mountain such as of FIG. 13 formed by the focal voltage with reference to the output voltage of the integration circuit 10 and then reaches the steady state while minutely oscillating at the top of the mountain, thereby effecting automatic focus detection.

Since the mountain climbing system described above makes automatic focus detection by use of the output signal itself of image pickup means, the system has the advantages in that constituent elements for automatic focus detection need not be disposed particularly, and the system is relatively economical and can detect focus correctly.

In accordance with the conventional mountain climbing system described above, however, it is not possible to judge whether or not the top (maximum value) of the mountain of the focal voltage under the in-focus condition has been reached unless descension is made. For this reason, the steady state is reached while minute oscillation is being made near the top of the mountain. In other words, the motor repeats normal and reverse rotation under the focus state and ascension and descension are made near the top of the mountain under the constantly oscillating state. This oscillation results in degradation of picture quality and must be eliminated.

SUMMARY OF THE INVENTION

It is therefore an object of the present invention to provide an automatic focussing system which solves the problems described above, eliminates the oscillating state of the lens at the top of the mountain of the focus point and makes accurate focussing operation.

To accomplish the object described above, the automatic focussing system in accordance with the present invention comprises output means for sequentially outputting signals in accordance with the focus state in predetermined period, prediction means for predicting the focus point by use of at least three signals outputted from the output means and control means for controlling the focus on the basis of result of prediction by the prediction means when the difference of the outputs of two signals outputted from the output means is below a predetermined value, and can stop the lens at the focus point without oscillating the lens of photographic lens system.

The same action and effect as those described above can be obtained by the control means which controls the focus on the basis of result of prediction of the prediction means when the level of the signal outputted from the output means satisfies a predetermined condition.

When the automatic focussing system of the invention is further provided with detection means for detecting lens information of a photographic lens and correction means for correcting the prediction value of the prediction means in accordance with the lens information detected by the detection means, the system can always make accurate focus control irrespective of the lens condition.

Furthermore, when the automatic focussing system of the present invention is further provided with prediction means for predicting at least one of the maximum level of the signal by use of a plurality of successive signals outputted from the output means and the timing at which the maximum level is obtained, and inhibition means for inhibiting the focus control on the basis of result of prediction when at least one of the maximum level and the timing predicted by the prediction means changes to such an extent as to exceed an allowable range with respect to the predicted values of the previous predicting operation, the system can always make correct focus control without making focus control on the basis of the erroneous predicted values.

These and other objects and novel features of the present invention will become more apparent from the following detailed description when taken in conjunction with the accompanying drawings.

DESCRIPTION OF THE PREFERRED EMBODIMENTS

Hereinafter, some preferred embodiments of the present invention will be described in detail with reference to the accompanying drawings.

[Fundamental Construction]

Figure 1:
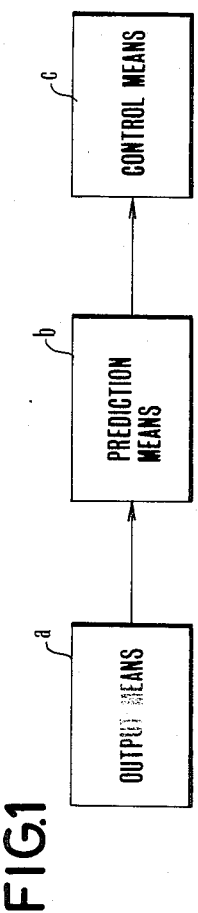
FIG. 1 is a block diagram showing the fundamental construction of the first embodiment of the present invention.

FIG. 1 shows the fundamental construction of the first embodiment of the present invention. In the drawing, symbol "a" represents output means for sequentially outputting signals corresponding to the degree of focussing in a predetermined period and symbol "b" represents prediction means for predicting the focus point by use of at least three signals outputted from the output means a. Symbol "c" represents control means for controlling the focus on the basis of result of prediction by the prediction means b when the output difference between the two signals outputted from the output means a is above a predetermined value.

[Circuit Construction]

Figure 2:
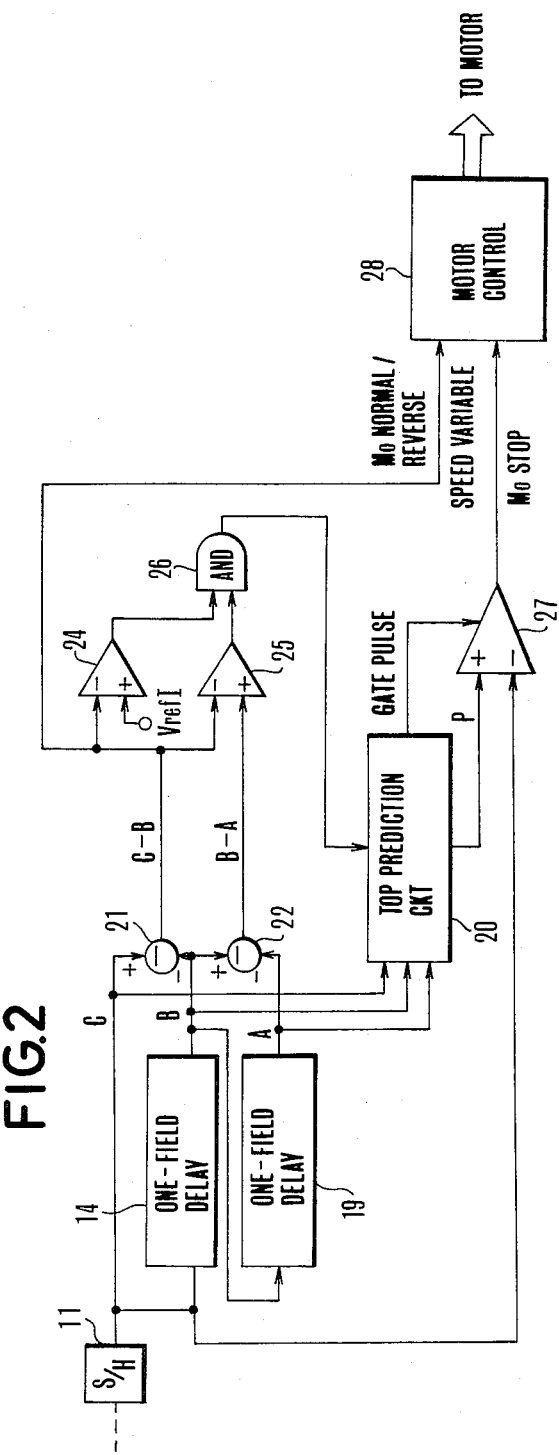
FIG. 2 is a circuit diagram showing the circuit construction of the first embodiment of the invention.

FIG. 2 shows the circuit construction of the embodiment of the present invention. Reference numeral 19 represents a one-field delay circuit, which receives the focal voltage B of the previous field delayed by one field, and outputs the focal voltage A of the preceding field before last which is delayed by two fields with respect to the present field. Reference numeral 20 represents a top prediction circuit as prediction means. This circuit predicts after the passage of how many more fields the focal voltage reaches the focal voltage P (see FIG. 8) of the top corresponding to the focus state on the basis of a known calculation formula, such as a prediction formula of a secondary function $y=ax^2+by+c$ (where x is a field number and y is the focal voltage) using the input focal voltage C of the present field, the focal voltage B of one previous field and the focal voltage A of the preceding field before last as parameters, outputs the timing signal after the predicted N fields as a gate signal and also outputs the focal voltage P of the predicted top as a comparison signal P.

Figure 8:
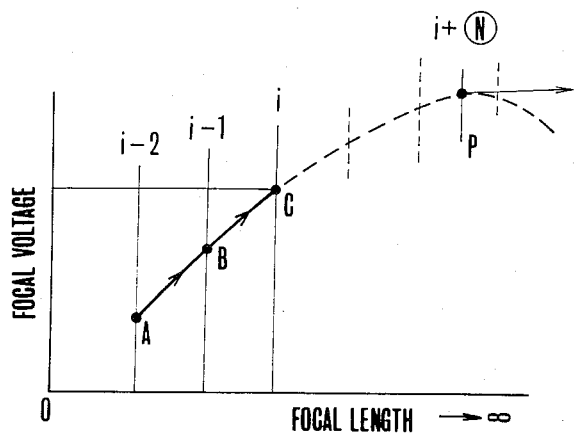
FIG. 8 is a characteristic diagram showing the relationship between the focal length and the focal voltage and being useful for explaining the action of the first to third embodiments of the invention.

It will be hereby assumed that the focal voltage of the present field (i) is C, the focal voltage B of the previous field (i−1) is B and the focal voltage A of the preceding field before last (i−2) is A, as shown in FIG. 8. Reference numeral 21 represents a first subtraction circuit, which subtracts the focal voltage B from the focal voltage C and outputs a signal corresponding to the difference C−B. Reference numeral 22 represents a second subtraction circuit, which substracts the focal voltage A from the focal voltage B and outputs a signal corresponding to the difference B−A.

Reference numeral 24 represents a first comparator, which compares the output (C−B) of the first subtraction circuit 21 inputted to its inversion input terminal with a predetermined threshold value $V_{refl}$ set to its non-inversion input terminal, judges whether or not $C-B<V_{refl}$ and outputs a high level signal if the judgement proves YES. Reference numeral 25 represents a second comparator, which compares the output (C−B) of the first substraction circuit 21 inputted to its invention input terminal with the output (B−A) of the second subtraction circuit 22 inputted to its non-inversion input terminal, judges whether or not C−B<B−A and outputs a high level signal if the judgement proves YES.

Reference numeral 26 represents an AND circuit, which calculates the logical product between the outputs of the two comparators 24 and 25 described above, opens its gate and produces a high level signal when all their outputs are at the high level. The output signal of this AND circuit 26 is supplied as a signal for controlling the top prediction circuit 20 described above. Reference numeral 27 represents a third comparator, which compares the predicted maximum focal voltage P applied to its non-inversion input terminal from the top prediction circuit 20 with the present focal voltage C in the present field applied to its inversion input terminal from the sample-hold circuit 11 so as to judge whether or not P≧C and outputs a motor stop signal when the result of judgement is YES and at the same time, when the gate pulse (timing signal) from the top predication circuit 20 is ON. The comparator 27 itself may have a relatively wide margin for comparison and judgement.

Reference numeral 28 represents a motor control circuit (M. control) as control means for driving and controlling a lens moving motor 18 to move the range ring of the focussing lens 2. This circuit 18 judges the polarity (positive or negative) of the output (C−B) of the first subtraction circuit 21, rotates normally the motor 18 when the polarity is negative and reversely when the polarity is positive. The motor control circuit 28 reduces the speed of the motor 18 when the level of the output (C−B) of the subtraction circuit 21 is low and increases the speed when the level is high. In this manner, the motor control circuit changes over the rotating direction of the motor 18 in accordance with the output polarity of the subtraction circuit 21 and variably controls the speed of the motor 18 in accordance with the level of the output of the subtraction circuit 21. Furthermore, the motor control circuit 28 stops the motor 18 in accordance with the motor stop signal supplied thereto from the third comparator 27.

Figure 12:
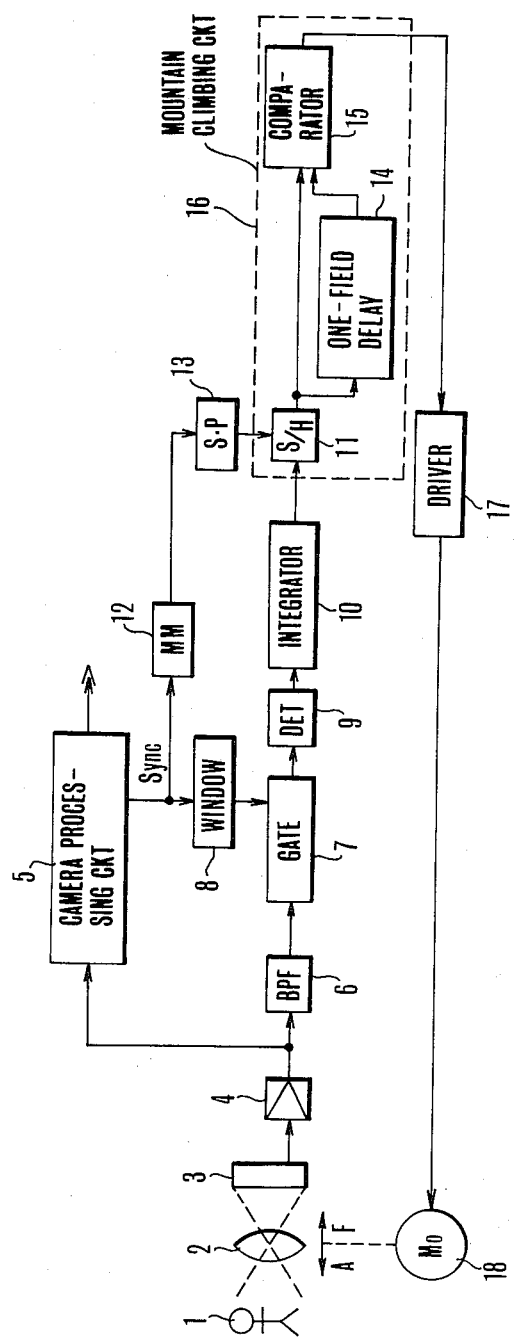
FIG. 12 is a block diagram showing the circuit construction of a prior art example.

Since the constituent portions of the pre-stage of the sample-hold circuit 11 are the same as those of the prior art example shown in FIG. 12, their detail description will be hereby omitted.

[Operation of the Embodiment]

Next, the embodiment of the present invention shown in FIG. 2 will be explained with reference to FIG. 8.

The ray of light from the object 1 is image-formed by the lens 2 on the photoelectric conversion means 4 and the video signal converted to the electric signal is inputted to the sample-hold circuit (S/H) 11 through BPF 6, the gate circuit 7, the detector 9 and the integrator 10 in the same way as in the afore-mentioned prior art example shown in FIG. 12 and is held in each field. The output of the sample-hold circuit 11 is inputted to each of the post-stage circuits, that is, the first field delay circuit 14, the first subtraction circuit 21, the third comparator 27 and the top prediction circuit 20.

The focal voltage B of the previous field which is delayed by one field by the first field delay circuit 14 is inputted to the two subtraction circuits 21, 22, the top prediction circuit 20 and to the second field delay circuit 19. The focal voltage A of the preceding field before last which is delayed further by one field by the second field delay circuit 19 is supplied to the second subtraction circuit 22 and the top prediction circuit 20.

The subtraction output (C−B) of the first subtraction circuit 21 is supplied to the inversion input terminal of the first comparator 24 and the inversion input terminal of the second comparator 25, and the output of the second subtraction circuit 22 is supplied to the non-inversion input terminal of the second comparator 25. The output (C−B) of the first subtraction circuit 21 is supplied also to the motor control circuit 28. The output (C−B) of the first subtraction circuit 21 is compared by the first comparator 24 with the predetermined threshold value $V_{refl}$ and the comparator 24 outputs the high level signal to the AND circuit 26 when $C-B<V_{refl}$. Furthermore, the output (C−B) of the first subtraction circuit 21 is compared with the output (B−A) of the second subtraction circuit 22 by the second comparator 25 and when C−B<B−A, the comparator 25 outputs the high level signal to the AND circuit 26.

When the judgement outputs of the comparators 24 and 25 described above are all at the high level, that is, when the following conditional formulas representing that the maximum focal voltage P is being closely attained are all satisfied, the AND circuit 26 is at the high level and actuates the top prediction circuit 20:

$C-B<V_{refl}$

C−B<B−A

In other words, when the difference between the focal voltage B of the previous field and the focal voltage C of the present field is below a predetermined level ($C-B<V_{refl}$), that is, when the inclination of the mountain is not so steep and the top P is nearly reached and furthermore, when the inclination judged in the present field is smaller than that of the previous field (C−B<B−A), the condition at such a time is that the top of the mountain is almost attained, it is possible to easily predict the focal voltage (predicted focal voltage) P at the top of the mountain and after the passage of how many more fields the top can be predicted, by operating the top prediction circuit 26 from a simple secondary function, or the like.

The top prediction circuit 20 operates in accordance with the output of the AND circuit 26 described above and predicts the maximum focal voltage P at the top corresponding to the focus state and after the passage of how many more fields the maximum focal voltage P can be attained on the basis of the secondary function using the input focal voltages A, B and C as the parameters.

The top prediction circuit 20 outputs as a gate signal the timing signal after N fields, in which N fields the top of the mountain is predicted to be attained, to the third comparator 27 and outputs the predicted maximum focal voltage P to the non-inversion input terminal of the third comparator 27. Upon receiving the gate signal, the third comparator 27 opens the gate and outputs the motor stop control signal to the motor control circuit 28 under the condition $P \geq C$.

The motor control circuit 28 rotates normally the motor 18 in accordance with the polarity of the output of the subtraction circuit 21, that is, when the polarity is positive or when the difference between the focal voltage C of the present field and the focal voltage B of the previous field is $C > B$ as shown in FIG. 8, and rotates reversely the motor 18 when the polarity is negative or when $C < B$. In other words, the motor control circuit 28 rotates the motor 18 normally or reversely, rotates the motor 18 at a high speed when the level of the output (C−B) of the subtraction circuit 21 is above the predetermined level and changes over the rotating speed to the low speed when the output (C−B) of the subtraction circuit 21 is below the predetermined level. Therefore, the motor control circuit 28 rotates at a high speed the motor 18 when the focus point is away in order to rapidly reach the focus point, and when the focussing lens comes close to the focus, the motor control circuit 28 changes the speed of the motor 18 to the low speed and stops the motor 18 in accordance with the motor stop control signal outputted from the third comparator 27 when the focus point is attained. Therefore, in accordance with this embodiment, the lens 2 can be stopped rapidly at the focus point without oscillating near the focus point.

Figure 3:
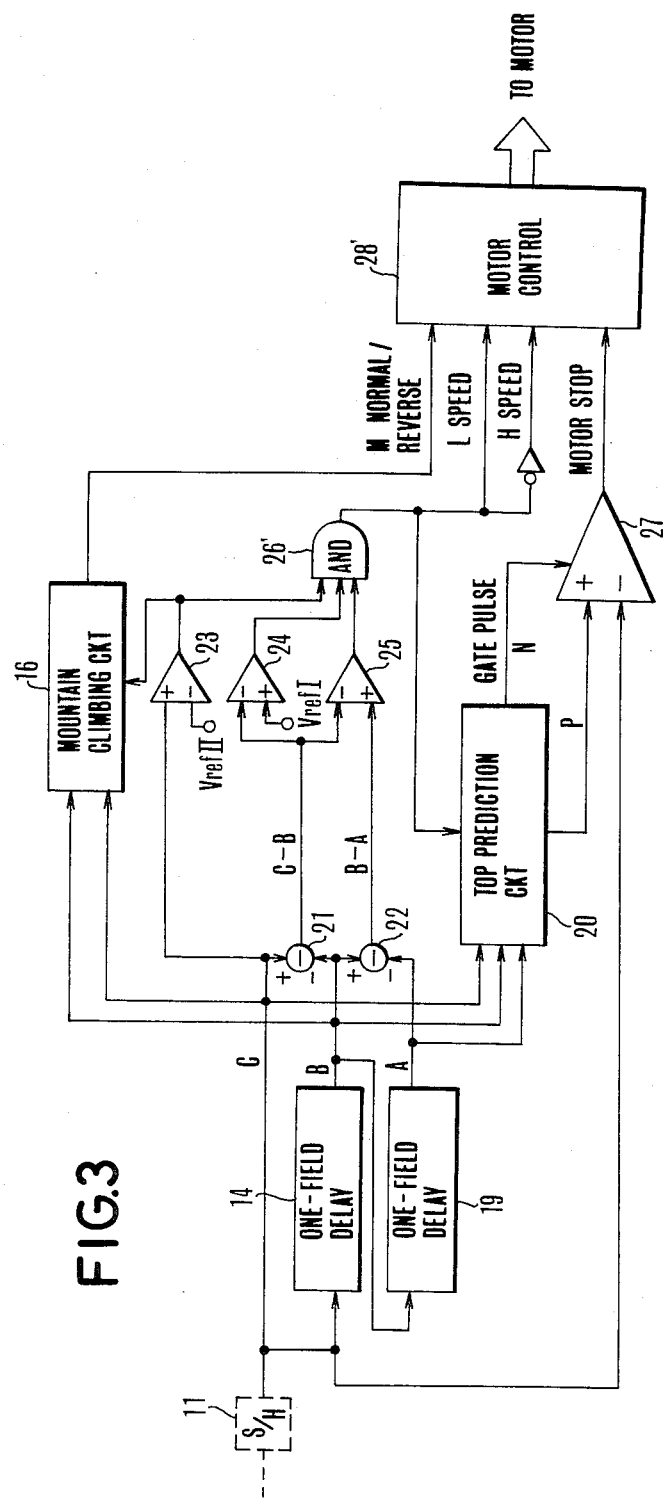
FIG. 3 is a circuit diagram showing the circuit construction of the second embodiment of the invention.

FIG. 3 shows the circuit construction in the second embodiment of the present invention. The fundamental construction of this embodiment is the same as that of the first embodiment shown in FIG. 1, except that when the level of the signal outputted from the output means "a" satisfies the predetermined condition in the control means "c", the focus adjustment is made on the basis of result of prediction by the prediction means "b".

The construction and operation of this second embodiment will be described next with reference to FIG. 3, and like reference numerals will be used to identify like constituent elements as in the first embodiment shown in FIG. 2 and the detailed description of such constituent elements will be omitted.

In this drawing, reference numeral 23 represents a fourth comparator which is disposed afresh. This comparator 23 compares the focal voltage C applied to its non-inversion input terminal with a predetermined threshold value $V_{refII}$ set to its inversion input terminal, judges whether or not $C > V_{refII}$ and outputs a high level signal when the judgement proves YES. Reference numeral 26' represents an AND circuit as control means, which calculates the logical product of the outputs of the three comparators 23, 24 and 25 described above, opens the gate when all the outputs are at the high level, and outputs the high level signal. The output signal of this AND circuit 26' is supplied as the control signal for the top prediction circuit and also as the motor speed control signal.

Reference numeral 28' represents a motor control circuit (M. control) for driving and controlling the lens moving motor 18 for moving the range ring of the focussing lens 2. The motor 18 is rotated normally and reversely when the output of the mountain climbing circuit 16 is at the high and low levels, respectively. The control circuit 28' reduces the speed of the motor 18 to low and high speeds when the output of the AND circuit 26 is at the high and low levels, respectively, and stops the motor 18 in accordance with the motor stop signal from the third comparator 27. The mountain climbing circuit 16 has substantially the same construction at that of the prior art example shown in FIG. 12, operates in accordance with the output of the first comparator, comparates the focal voltages C with B, and outputs the high level signal for rotating normally the motor and the low level signal for rotating reversely the motor when $C > B$ and $C < B$, respectively.

Since the rest of the constituent portions are the same as those of the prior art example shown in FIG. 12, their detailed description will be omitted.

[Operation of this Embodiment]

Next, the operation of the embodiment shown in FIG. 3 will be described with reference to FIG. 8.

The ray of light of the object 1 is image-formed by the lens 2 on the photoelectric conversion means 4 and the video signal converted to the electric signal is inputted to the sample-hold circuit (S/H) 11 through BPF 6, the gate circuit 7, the detector 9 and the integrator 10 in the same way as in the afore-mentioned prior art example, and is held for each field. The output of the sample-hold circuit 11 is inputted to the first field delay circuit 14, the fourth comparator 23, the first subtraction circuit 21, the third comparator 27, the top prediction circuit 20 and the mountain climbing circuit 16 of the post-stage.

The focal voltage B of the previous field, which is delayed by one field by the first field delay circuit 14, is supplied to the two subtraction circuits 21, 22 and the top prediction circuit 20 and also to the second field delay circuit 19. The focal voltage A of the preceding field before last, which is further delayed by one field by the second field delay circuit 19, is supplied to the second subtraction circuit 22 and the top prediction circuit 20.

The subtraction output (C−B) of the first subtraction circuit 21 is supplied to the inversion input terminal of the second comparator 24 and the inversion input terminal of the second comparator 25 and the output of the second subtraction circuit 22 is supplied to the non-inversion input terminal of the second comparator 25. The present field focal voltage C from the samplehold circuit 11 is compared with a predetermined threshold value $V_{refII}$ by the fourth comparator 23, which outputs the high level signal to the mountain climbing circuit 16 and the AND circuit 26' when $C > V_{refII}$. The output (C−B) of the first subtraction circuit 21 is compared with the predetermined threshold value $V_{refI}$ by the first comparator 24, which outputs the high level signal to the AND circuit 26' when $C-B<V_{refI}$. Furthermore, the output (C−B) of the first subtraction circuit 21 and the output (B−A) of the second subtraction circuit 22 are compared with each other by the second comparator 25, which outputs the high level signal to the AND circuit 26' when $C-B<B-A$.

When the judgement outputs of the comparators 23, 24, and 25 are all at the high level, that is, when the following conditional formulas representing that the maximum focal voltage P is nearly attained are all satisfied, the AND circuit 26' is at the high level and actuates the top prediction circuit 20:

$C>V_{refII}$
$C-B<V_{refI}$
$C-A<B-A$

In other words, the state where the focal voltage C of the present field is sufficiently high ($C>V_{refII}$) and at the same time, the difference between the focal voltage B of the previous field and the focal voltage B of the present field is below a predetermined level ($C-B<V_{refI}$) or in other words, when the inclination of the mountain is not so steep and the top P is sufficiently near, the inclination of the mountain judged in the present field is found smaller than that of the previous field ($C-B<B-A$), it corresponds to the state where the top of the mountain comes closer and is sufficiently near, it becomes easy to predict the focal voltage (predicted focal voltage) P at the top of the mountain and to predict after the passage of how many more fields the top can be predicted, from a simple secondary function or the like by operating the top prediction circuit. As the secondary function, $y=ax^2+bx^2+c$ (where x is the number of fields and y is the focal voltage) is used, for example.

The top prediction circuit 20 operates in accordance with the output of the AND circuit 26' in the same way as in the first embodiment, and predicts the maximum focal voltage P corresponding to the focus state and after the passage of how many more fields the maximum focal voltage P is attained, on the basis of the secondary function using the input focal voltages A, B and C as the parameters.

The top prediction circuit 20 outputs as the gate signal the timing signal after the N fields, in which N fields the top is predicted to be attained, to the third comparator 27 and outputs the predicted maximum focal voltage P to the non-inversion input terminal of the comparator 27. Upon receiving the gate signal, the third comparator 27 opens its gate and outputs the motor stop control signal to the motor control circuit 28' under the condition $P \geq C$.

The mountain climbing circuit 16 generates to the motor control circuit 28' a control signal for rotating normally the motor 18 when the relation between the focal voltage C of the present field and the focal voltage B of the previous field is C>B and reversely when C<B. The motor control circuit 28' rotates normally or reversely the motor 18 in accordance with the output signal of the mountain climbing circuit 16 and rotates the motor 18 at a high speed when the output of the AND circuit 26' is at the low level and at the low speed when the output is at the high level. Therefore, during the non-operation of the top prediction circuit 20, that is, when only the mountain climbing circuit 16 is in operation, the motor control circuit 28' rotates the motor 18 at the high speed so as to bring the focussing lens close to the focus point and when the lens comes near to the focus point, it switches the motor 18 to the low speed rotation. The motor control circuit 28' stops the motor 18 in accordance with the motor stop control signal outputted from the comparison circuit 27 when the focus point is attained. Thus, this embodiment can stop the lens 2 accurately and rapidly without oscillation near the focus point.

Figure 4:
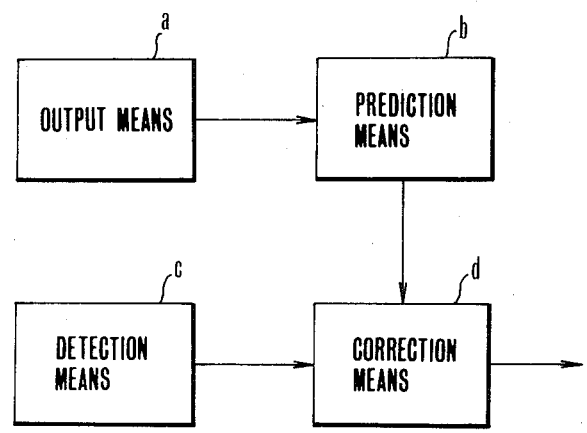
FIG. 4 is a block diagram showing the fundamental construction of the third embodiment of the invention.
Figure 5:
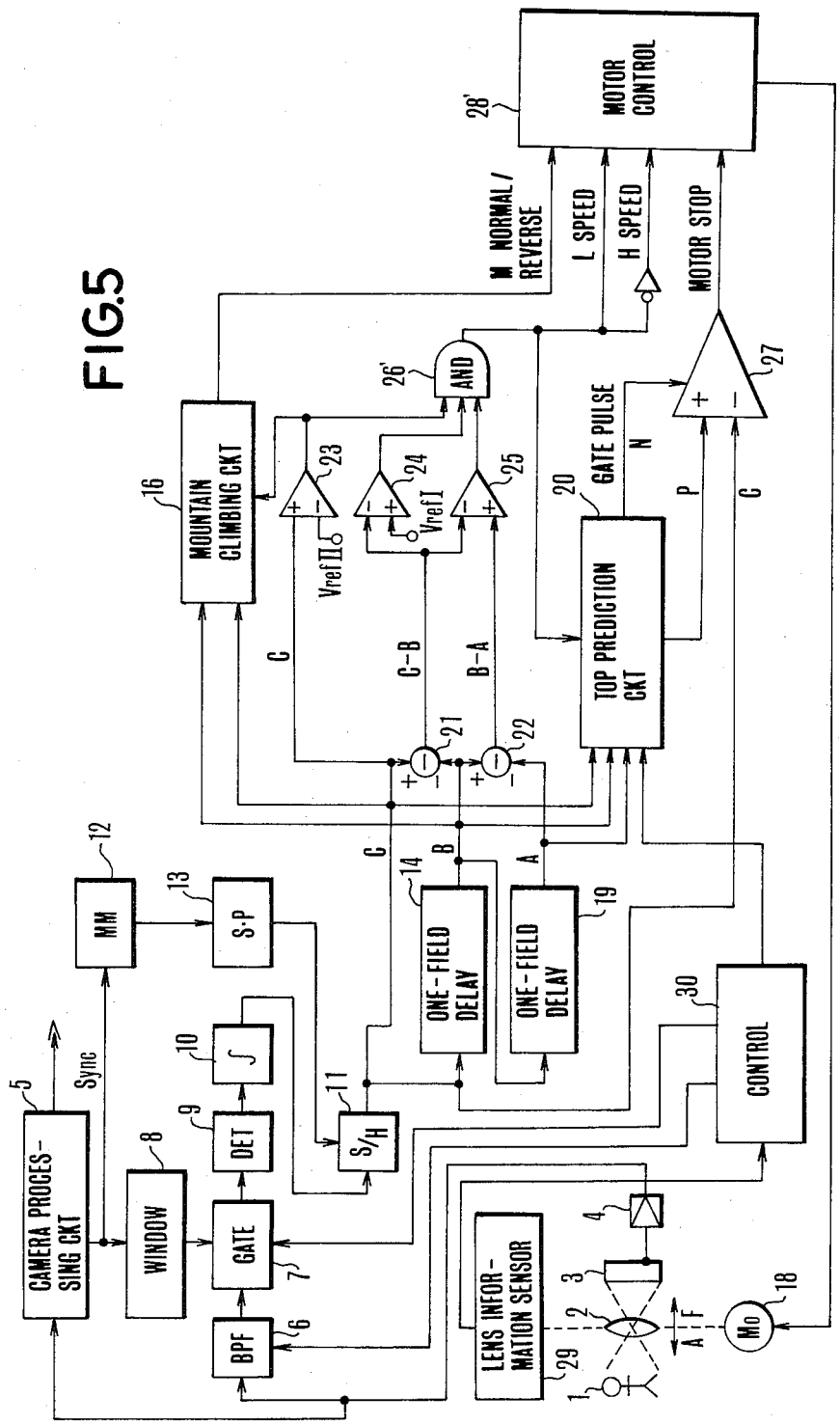
FIG. 5 is a circuit diagram showing the circuit construction of the third embodiment of the invention.

FIG. 4 is a block diagram showing the fundamental construction of the third embodiment of the present invention and FIG. 5 is a circuit diagram showing its circuit construction.

[Fundamental Construction of this Embodiment]

In FIG. 4, symbol "a" represents output means for sequentially outputting the signal corresponding to the degree of focussing at a predetermined timing and symbol "b" represents prediction means for predicting the degree of focussing by use of at least three successive signals extracted from the output means "a". Symbol "c" represents detection means for detecting lens information of photographic lens and symbol "d" represents correction means for correcting the predicted value of the prediction means. The correction means "d" also adjusts various constants of the constituent elements of the output means "a" such as a filter and a gate circuit to suitable values in accordance with the lens information.

In other words, this embodiment corrects the predicted value and the output means in accordance with the lens information that is detected, so that accurate focus control can be made under all conditions.

[Circuit Construction]

In FIG. 5, like reference numerals are used to identify like constituents as in the prior art example shown in FIG. 12 and the embodiments of the invention shown in FIGS. 2 and 3, and the description of such constituents is omitted. Namely, only the different structural portions will be hereby explained.

In the drawing, reference numeral 29 represents a lens information sensor as the detection means, which detects information on the lens condition of the focussing lens 2 such as an F number $F_{NO}$, the absolute address of the range ring, the focal length, and so forth. Reference numeral 30 represents a control circuit as the correction means, which corrects all or part of the frequency characteristics of BPF 6, the magnitude of the window pulse inputted to the gate circuit 7 and the predicted value of the top prediction circuit 20 in accordance with the detection output of the lens information sensor 29. For instance, since the information within the picture surface varies in accordance with the focal length, the control circuit 30 narrows the window at the time of the wide scope through the gate circuit 7 and expands it at the time of a telescope. When the F number $F_{NO}$ is great, the depth of field becomes great and the inclination of the mountain of the focal voltage characteristics becomes gentle. Therefore, the control circuit 30 selects the filter value of BPF 6 in order to increase the depth of field.

Figure 6:
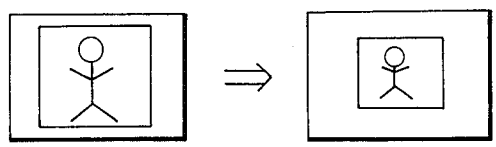
FIG. 6 is an explanatory view useful for explaining the operation of a control circuit 30 in the third embodiment of the invention.

In other words, since the information quantity inside the picture surface varies upon zooming as shown in FIG. 6, the degree of opening of the gate circuit 7 is changed by the control circuit 30 in order to keep the information quantity as constant as possible. For instance, the control circuit 30 changes the degree of opening of the gate of the distance measuring area with respect to the whole picture surface in accordance with the change from the telescope (large focal length) on the left side of the drawing to the wide scope (small focal length) on the right.

Figure 7:
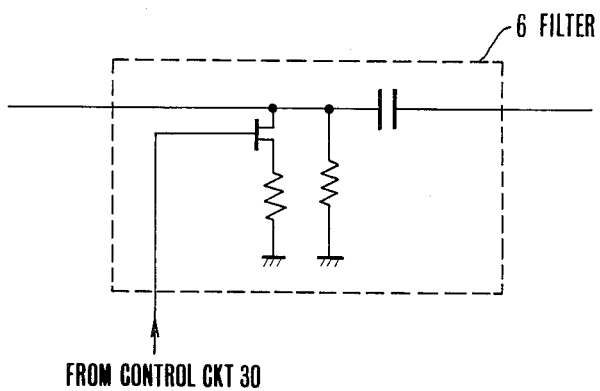
FIG. 7 is a circuit diagram showing an exemplary construction of a filter 6 in the invention.

When the video signal is on a higher band side, the mountain (the mountain of the focal voltage characteristics) becomes steeper as much. Therefore, the control circuit 30 switches the filter 6 to the higher band side under the condition where the mountain is gentle by the lens information at that time, and to the lower band side under the condition where the mountain is formed sufficiently. For instance, the mountain becomes gentle when the focal length of the lens 2 is small or when the lens stop value is small, and the sufficiently steep mountain is formed in the opposite case. When a high-pass filter such as shown in FIG. 7 is used as the band-pass filter 6, FET (field effect transistor) is turned ON by the signal from the control circuit 30 and the pass band is changed over to the high band side.

The angle of view of the picture surface changes during zooming. More definitely, the angle of view becomes small when the focal length becomes great and the possibility drops in that the edge of the object enters the picture surface. Therefore, the output of BPF 6 drops. On the contrary, when the focal length becomes great, the angle of view becomes great so that the possibility that the edge of the object enters the picture surface becomes great, and hence the output of BPF 6 increases. Therefore, when the focal length becomes great upon zooming, the predicted value of the top prediction value 20 is reduced by the signal of the control circuit 30 and is increased by the signal of the control circuit 30 when the focal length becomes small.

Since the rest of constructions are the same as those of the prior art example shown in FIG. 12 and the embodiments of the invention shown in FIGS. 2 and 3, their detailed explanation will be omitted.

[Operation of the Embodiment]

Next, the operation of the embodiment of the invention shown in FIG. 5 will be explained with reference to FIG. 8.

As described already, the information of the focusing lens 2 is detected by the lens information sensor 29 and the lens information thus detected is supplied to the control circuit 30. The control circuit 30 changes the predetermined values of the filter (BPF) 6 for extracting the focal voltage and the gate circuit 7 in accordance with the output information of the lens information sensor 29, and outputs the control signal for correcting the predicted value of the top prediction circuit 20.

As to the timing of the focus state and the focal voltage at that time, the top prediction circuit 20 predicts after passage of how many fields the focus state is attained, or in other words, the top focal voltage P is attained, from the outputs from the one-field delay circuits 14, 15, in the same way as in the second embodiment shown in FIG. 3.

Similarly, the output signal C and the signals C−B and B−A outputted through the subtraction circuits 21, 22 are supplied to the comparison circuits 23, 24, 25 and the AND circuit 26' judges whether or not the focus point is near.

In the same way as in the second embodiment shown in FIG. 3, when the following conditional formulas representing that the maximum focal voltage P is sufficiently near are all satisfied, the output of the AND circuit 26' becomes at the high level and the top prediction circuit 20 is operated in the same way as in the second embodiment of the invention shown in FIG. 3:

$C > V_{refII}$
$C - B < V_{refI}$
$C - B < B - A$

Therefore, it is possible to easily predict after the passage of how many more fields the top focal voltage predicted focal voltage) is attained, from a simple secondary function, or the like. The predicted value from the top prediction circuit 20 is corrected in accordance with the lens information supplied from the control circuit 30. For instance, when the zoom lens is moving, the focal length and the like change incessantly and there is the possibility that the predicted value P after several fields are not in agreement but are greater or smaller between them. Therefore, the predicted value is corrected in the top prediction circuit 20 on the basis of the lens information.

The top prediction circuit 20 outputs, as the gate signal, the timing signal after the N fields, in which N fields the top is predicted to be reached, to the third comparator 27 and outputs the predicted maximum focal voltage P to the non-inversion input terminal of the comparator 27. Upon receiving the gate signal, the third comparator 27 opens its gate and outputs the motor stop control signal to the motor control circuit 28 under the condition $P \geq C$.

In the same way as in the second embodiment, the motor control circuit 28' controls the rotation of the motor 18 in the normal and reverse directions in accordance with the output signal of the mountain climbing circuit 16 (normal rotation when $C > B$ and reverse rotation when $C < B$), and controls the rotating speed of the motor 18 in accordance with the output of the AND circuit 26' (to high speed when the output of the AND circuit 26' is at the low level and to low speed when the output is at the high level). Therefore, during the non-operation of the top prediction circuit 20 or during the operation of only the mountain climbing circuit 16, the motor control circuit 28 rotates the motor 18 at the high speed so as to bring the lens close to the focal point and when the lens comes close to the lens, the control circuit 28 changes the speed of the motor 18 to the low speed. When the lens reaches the focus state, the motor control circuit 28 stops the motor 18 in accordance with the motor stop control signal outputted from the comparison circuit 27. Therefore, the motor control circuit 28 can stop the motor 18 rapidly and accurately irrespective of the lens condition without oscillating near the focus point.

Figure 9:
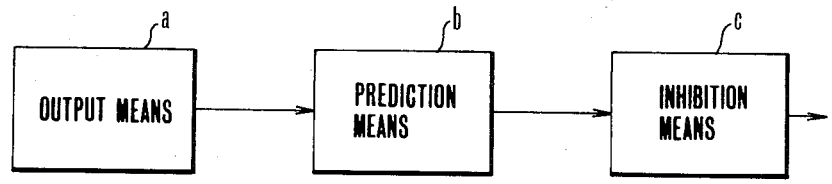
FIG. 9 is a block diagram showing the fundamental construction of the fourth embodiment of the invention.
Figure 10:
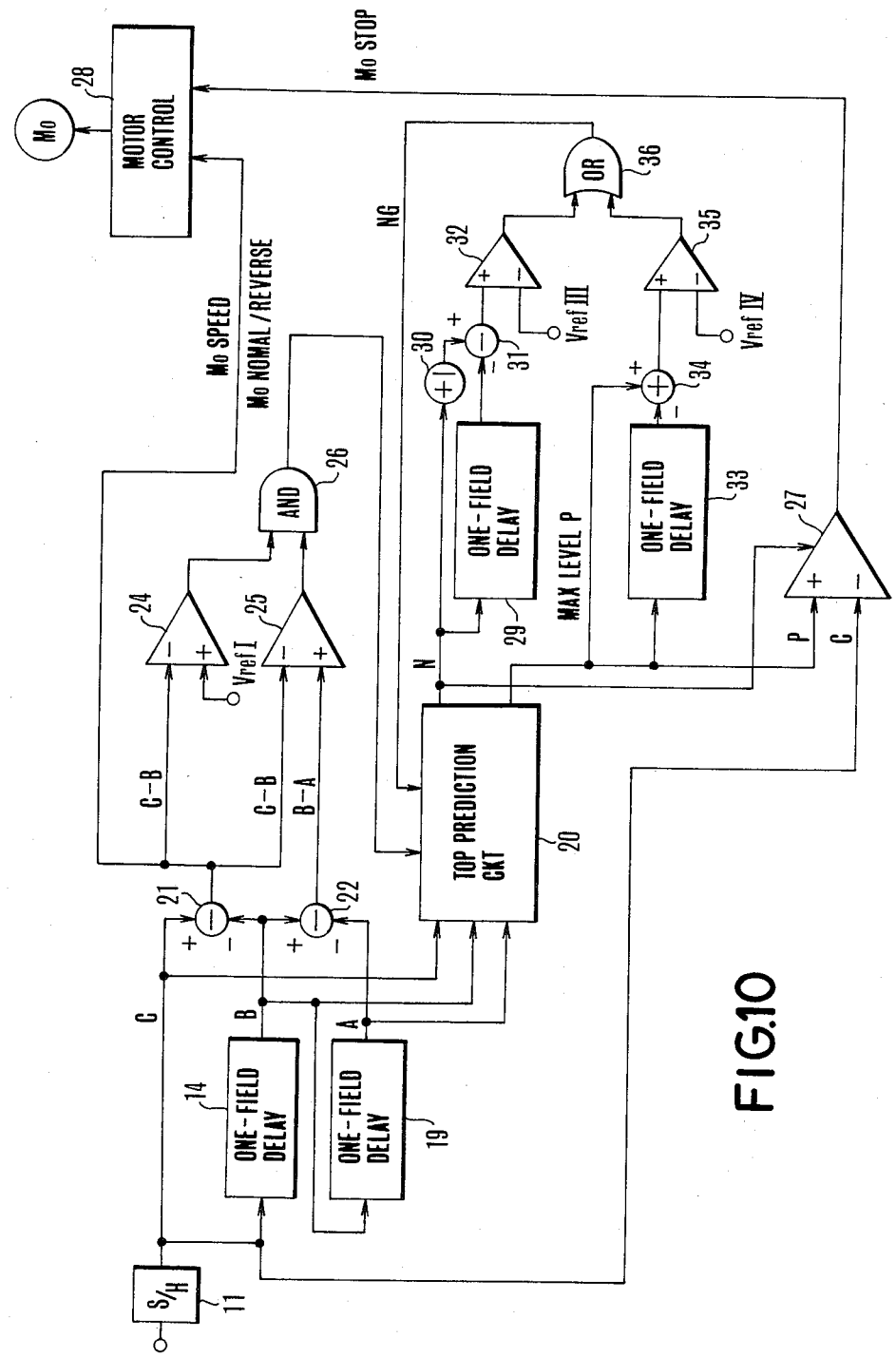
FIG. 10 is a circuit diagram showing the circuit construction of the fourth embodiment of the invention.

FIG. 9 is a block diagram showing the fundamental construction of the fourth embodiment of the present invention and FIG. 10 is a circuit diagram showing its circuit construction.

[Fundamental Construction of this Embodiment]

In FIG. 9, symbol "a" represents output means for sequentially outputting signals corresponding to the degree of focussing in a predetermined period and symbol "b" represents prediction means for predicting at least one of the maximum level of the signal and the timing at which the maximum level is obtained, by use of a plurality of successive signals outputted from the output means "a" in the predetermined period described above. Symbol "c" represents inhibition means for inhibiting the focus control on the basis of result of prediction by the prediction means "b" when at least one of the maximum level predicted by the prediction means "b" and the timing described above changes beyond the allowable range with respect to the previous predicted values.

In other words, this embodiment inhibits focus control on the basis of the result of erroneous prediction when there is no reliability of the information relating to the predicted focus state.

[Circuit Construction]

In FIG. 10, like reference numerals are used to identify like constituents as in the prior art example shown in FIG. 12 and the embodiments of the invention shown in FIGS. 2, 3 and 5, and the description of such constituents will be omitted. Particularly, the circuit construction other than the inhibition means is the same as that of the first embodiment shown in FIG. 2.

Figure 11:
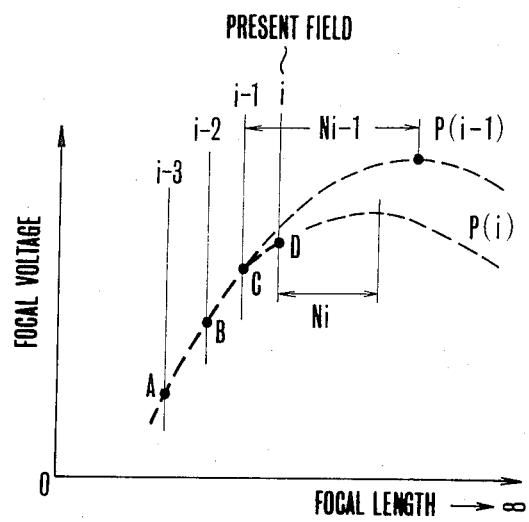
FIG. 11 is a characteristic diagram showing the relationship between the focal length and the focal voltage and being useful for explaining the action of the fourth embodiment of the invention.
Figure 13:
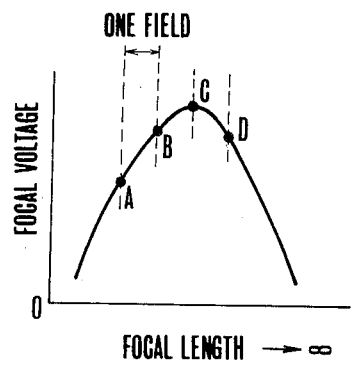
FIG. 13 is a characteristic diagram showing the action of the prior art example.

In the drawing reference numerals 29 to 36 represent those circuit constituents which constitute the circuit as the inhibition means for stopping (inhibiting) the predicting operation of the top prediction circuit 20 when the updating or change width of the predicted values N and P of the top prediction circuit 20 exceed the predetermined allowable range. As shown in FIG. 11, the timing signal which predicts after the passage of how many more fields (N fields) from the present field i outputted from the top prediction circuit 20 the maximum value (P) of the focus signal (focal voltage) appears will be hereinafter called the "signal N", and the predicted maximum focal voltage P will be hereinafter called the "signal P". The signals N and P in the present field will be called the "signals $N_i$ and $P_i$" and the signals N and P in the previous field (i) will be called the "signals $N_{i-1}$ and $P_{i-1}$", respectively. Furthermore, the focal voltages in the present field (i), the previous field (i−1) and the preceding field before last (i−2) will be called "C", "B" and "A", respectively.

Reference numeral 29 represents one-field delay circuit for delaying the signal N outputted from the top prediction circuit 20 by one field, and reference numeral 30 represents an addition circuit for adding +1 to the signal N. Reference numeral 31 represents a subtraction circuit for subtracting the output $N_{i-1}$ of the one-field delay circuit 29 from the output $N_{i+1}$ of the addition circuit 30 and outputting the balance $N_{i+1} - N_{i-1}$. Reference numeral 32 represents a fourth comparator in this embodiment. This comparator 32 compares the output of the subtraction circuit 31 inputted to its non-inversion input terminal with a threshold value $V_{refIII}$ set to its inversion input terminal and outputs the high level signal when the following relation is satisfied:

$$N_{i+1} - N_{i-1} > V_{refIII} \qquad (1)$$

This threshold value $V_{refIII}$ represents the width of the allowable limit as the updating width in each field of the timing signal.

Reference numeral 33 represents a one-field delay circuit for delaying the signal P outputted from the top prediction circuit 20 by one field, and reference numeral 34 represents a subtraction circuit which subtracts the output $P_{i-1}$ of the delay circuit 33 from the signal P of the present field outputted from the top prediction circuit 20 and outputs $P_i - P_{i-1}$. Reference numeral 35 represents a fifth comparator, which compares the output of the subtraction circuit 34 inputted to is non-inversion input terminal with a threshold value $V_{refIV}$ set to its inversion input terminal and outputs the high level signal when the following relation is satisfied:

$$P_i - P_{i-1} > V_{refIV} \qquad (2)$$

This threshold value $V_{refIV}$ represents the width of the allowable limit as the updating width in each field of the predicted maximum focal voltage P.

Reference numeral 36 represents an OR circuit as judgement means for calculating the logical sum of the outputs of the comparators 32 and 35 and sending the result of calculation as an operation inhibition signal NG to the top prediction circuit 20. The prediction operation of the top prediction circuit 20 is inhibited when the operation inhibition signal NG is generated. In other words, when either of the conditions of the formulas (1) and (2) is established, the top prediction circuit 20 stops the prediction operation and no longer outputs the signals N and P. [Operation of this Embodiment]

Next, the operation of the embodiment shown in FIG. 10 will be described with reference to FIG. 11.

In the same way as in the first embodiment of the invention shown in FIG. 2, the output of the samplehold circuit 11 is supplied to the top prediction circuit 20 through the one-field delay circuits 14, 15 in order to predict after the passage of how many more fields the focus state or the top voltage P is attained. At the same time, the C−B and B−A signals are generated through the subtraction circuits 21, 22 and supplied to the first and second comparison circuits 24 and 25, and the AND circuit 26 judges whether or not the focus state is near. In the same way as in the embodiment shown in FIG. 2, all the following conditional formulas are satisfied and moreover, when the output of the AND circuit 26 is at the high level, the top prediction circuit 20 starts operating and outputs the predicted value at the predicted timing to the comparator 27 as well as the motor stop control signal to the motor control circuit 28 but under the condition $P \geq C$:

$C - B < V_{refI}$ $C - B < B - A$

The normal and reverse rotation control and the rotating speed control by the motor control circuit 28 are the same as in the first embodiment shown in FIG. 2.

Therefore, when the lens is remote from the focus point, the motor control circuit 28 rotates the motor 18 at the high speed so as to bring rapidly the lens close to the focus point and when the lens comes close to the focus state, the motor control circuit 28 changes the speed of the motor 18 to the low speed so as to slowly bring the lens to the focus point. When the focus point is attained, the motor control circuit 28 stops the motor 18 in accordance with the motor stop control signal outputted from the comparator 27. Therefore, the lens 2 can be stopped rapidly and accurately at the focus point without any oscillation near the focus point.

On the other hand, the timing signal outputted from the top prediction circuit 20, that is, the prediction signal N representing the number N (integer) of the predicted fields before the arrival at the predicted focal voltage P, is supplied to the addition circuit 30 and to the one-field delay circuit 29. The output $N_{i+1}$ of the present field after addition of 1 by the addition circuit 30 and the output Ni-1 of the previous field which is delayed by one field by the one-field delay circuit 29 are supplied to the subtraction circuit 31 and the result of subtraction $N_{i+1} - N_{i-1}$ is inputted from the subtraction circuit 31 to the non-inversion terminal of the fourth comparator 32. The comparator 32 compares the value received at its non-inversion terminal with the predetermined threshold value $V_{refIII}$ set to its inversion input terminal, and outputs the high level signal when the relation $N_{i+1} - N_{i-1} > V_{refIII}$ is established.

The predicted maximum focal voltage P outputted from the top prediction circuit 20 is supplied to the one-field delay circuit 33 and to the subtraction circuit 34, too. The output $P_{i-1}$ of the previous field delayed by one field by the delay circuit 33 is supplied to the subtraction circuit 34, and the subtraction circuit 34 inputs the balance obtained by subtracting the output $P_{i-1}$ of the previous field from the output $P_i$ of the present field to the non-inversion input terminal of the fifth comparator 35. This comparator 35 compares the value inputted to its noninversion input terminal with the predetermined threshold value $V_{refIV}$ set to its inversion input terminal, and outputs the high level signal when the relation $P_i - P_{i-1} > V_{refIV}$ is satisfied.

The outputs of the fourth and fifth comparators 32 and 35 are outputted as the operation inhibition signal NG to the top prediction circuit 20 through the OR circuit 36. In other words, when at least one of the relation $N_{i+1} - N_{i-1} > V_{refIV}$ and the relation $P_i - P_{i-1} > V_{refIV}$ is satisfied, the inhibition signal NG is sent from the OR circuit 36 to the top prediction circuit 20 and the prediction operation of the latter is inhibited.

The prediction operation described above will be explained in further detail with reference to FIG. 11. In FIG. 11, the top prediction circuit 20 predicts the voltage value P at the top, where the focus signal attains the maximum vlaue, and the field number N by use of the focus signal A of the preceding field $i-2$ before last in addition to the focus signal C of the previous field $i-1$, and it will be assumed that the prediction output signals in the previous field $i-1$ are $N_{i-1}$ as the timing signal and $P_{i-1}$ as the maximum prediction level signal.

Next, prediction and calculation are again made in the present field i in the same way as above. Namely, the top prediction circuit 20 makes prediction and calculation by use of the focus signal D of the present field i, the focus signal C of the previous field $i-1$ and the focus signal B of the preceding field $i-2$ before last, and the timing signal $N_i$ and the level signal $P_i$ are outputted.

It will be assumed that the level of the focus signal D of the present field is lower than the prediction line (represented by dash line in the drawing) predicted in the previous field $i-1$ as shown in FIG. 11. Then, the judgement circuit 29-35 described above judges whether or not the present predicted values $N_i$, $P_i$ change drastically with respect to the previous predicted values $N_{i-1}$, $P_{i-1}$. If the timing signal N and the level signal P are within the respective allowable ranges, the output signal of the top prediction circuit 20 is sequentially updated whenever the field becomes anew sequentially.

If the change of the predicted values in the fields exceeds the allowable ranges (corresponding to the threshold values $V_{refIII}$, $V_{refIV}$), at least one of the outputs of the fourth and fifth comparators 32 and 35 becomes the high level signal so that the OR circuit 36 sends the operation inhibition signal NG to the top prediction circuit 20 and the prediction operation of the top prediction circuit is stopped.

Therefore, when reliability of the predicted values is lost due to the change of the operating condition and the like, focus control on the basis of the wrong predicted values is not carried out. In other words, focus control can be made highly accurately and precisely.

In each of the embodiments described above, the comparator 27 itself may naturally have some margin for comparison and judgement when it compres the output signal C with the predicated top voltage P.

Incidentally, the present invention can be applied not only to the system in which the signal corresponding to the focus state is outputted from the output of the image pickup means but also to a system wherein a line sensor representing the focus state is used separately from the image pickup means.

What is claimed is:
1. An automatic focussing system comprising:
 (A) output means for sequentially outputting signals corresponding to a focus condition;
 (B) prediction means for predicting a focus point by use of a plurality of signals outputted from said output means; and
 (C) control means for controlling the focus on the basis of the result of prediction of said prediction means when the difference between the outputs of two of said signals outputted from said output means is below a predetermined value.
2. The automatic focussing system according to claim 1, wherein said predetermined value is a value based on the difference of two signals outputted before said two signals are outputted.
3. The automatic focussing system according to claim 1, wherein said output means outputs the signals corresponding to the focus state in a field period.
4. The automatic focussing system according to claim 1, wherein said prediction means predicts the timing at which the in-focus condition is established and the output value of said output means under the in-focus condition.
5. The automatic focussing system according to claim 1, wherein said control means operates said prediction means when the value based upon the difference between said two signals outputted from said output means is below a reference value and moreover, when it is below a value based on the difference of two signals outputted before said two signals.
6. The automatic focussing system according to claim 1 or 5, wherein said control means includes comparing means for comparing the predicted value, at the timing when it is outputted from said prediction means, with the output signal of said output means.
7. The automatic focussing system according to claim 6, wherein said control means stops the focus control operation when said predicted value is equal to said output signal.
8. The automatic focussing system according to claim 1, wherein said control means controls the focus controlling direction in accordance with the difference between at least two successive output values from said output means.
9. The automatic focussing system according to claim 1, wherein said control means controls the speed of focus control on the basis of the difference of at least two successive output values from said output means.
10. An automatic focussing system comprising:
 (A) output means for sequentially outputting signals corresponding to a focus condition;
 (B) prediction means for predicting a focus position of a plurality of signals outputted from said output means; and
 (C) control means for controlling the focus on the basis of the result of prediction by said prediction means when the levels of said signals satisfy a predetermined condition.

11. The automatic focussing system according to claim 10, wherein said control means is means for controlling the focus on the basis of the difference of two signals outputted from said output means when said signals do not satisfy said predetermined condition.

12. The automatic focussing system according to claim 10 or 11, wherein said predetermined condition means that the level of said signal is below a predetermined value.

13. The automatic focussing system according to claim 10, wherein said output means outputs signals corresponding to the focus condition in a field period.

14. The automatic focussing system according to claim 10, wherein said prediction means predicts the timing, at which the focus state is attained, and the output value of said output means under said focus state.

15. The automatic focussing system according to claim 10, wherein said control means outputs control signals for operating said prediction means under the state where said predetermined condition is satisfied, when the difference between the two signals outputted from said output means is below a reference value and moreover, below the difference of two signals outputted before said two signals.

16. The automatic focussing system according to claim 10 or 14, wherein said control means includes comparing means for comparing the predicted value, at the timing when it is outputted from said prediction means, with the output signal of said output means.

17. The automatic focussing system according to claim 16, wherein said control means stops the focus control operation when said predicted value is equal to said output signal.

18. The automatic focussing system according to claim 10, wherein said control means controls the speed for focus control on the basis of the difference between at least two successive output values from said output means.

19. An automatic focussing system comprising:
(A) output means for sequentially outputting signals corresponding to a focus condition of a photographic lens at a predetermined timing;
(B) prediction means for predicting the focus point by use of at least three successive signals outputted from said output means;
(C) detection means for detecting information relating to said photographic lens; and
(D) correcting means for correcting the predicted values of said prediction means in accordance with the information detected by said detection means.

20. The automatic focussing system according to claim 19, wherein said output means includes a filter for extracting a signal within a predetermined range from the output signals of image pickup means and a gate circuit.

21. The automatic focussing system according to claim 20, wherein said correcting means controls the set conditions of said filter and said gate circuit in accordance with said information.

22. The automatic focussing system according to claim 19 or 20, wherein said information relating to said photographic lens consists of detection information such as an F number, the position of a range ring, a focal length, and so forth.

23. The automatic focussing system according to claim 22, wherein said correction means corrects said gate circuit in accordance with the focal length and controls the range in which said signal relating to the focus condition is extracted.

24. The automatic focussing system according to claim 22, wherein said correction means controls the range of said filter to a value suitable for the depth of field in accordance with the F number.

25. The automatic focussing system according to claim 20, wherein said correction means corrects the predicted values of said prediction means in accordance with a zooming operation of said photographic lens.

26. The automatic focussing system according to claim 19 or 20 further comprising control means for operating said prediction means when the signal outputted from said output means is above a predetermined level.

27. The automatic focussing system according to claim 26, wherein said control means operates said prediction means when said signal is above said predetermined level, the difference between two signals outputted from said output means is below a reference value and moreover, below the difference between two signals outputted before said two signals.

28. An automatic focussing system comprising:
(A) output means for sequentially outputting signals corresponding to a focus condition;
(B) prediction means for predicting at least one of a maximum level and a timing, at which said maximum level is obtained, by use of a plurality of successive signals outputted from said output means; and
(C) inhibition means for inhibiting focus control on the basis of the result of prediction when at least one of said maximum level and said timing predicted by said prediction means changes above an allowable range with respect to the previous predicted values.

29. The automatic focussing system according to claim 28, wherein said prediction means is operated when the difference value between at least two signals outputted from said output means is below a predetermined value and below a difference value of two signals outputted before said two signals.

30. The automatic focussing system according to claim 28, wherein a focus control speed is controlled on the basis of the difference of two outputs outputted from said output means.

31. The automatic focussing system according to claim 28, wherein the direction of focus control is controlled in accordance with the polarity of two outputs outputted from said output means.

32. The automatic focussing system according to claim 28, wherein the result of prediction by said prediction means is updated together with a predetermined period unless said inhibition means operates.

* * * * *

UNITED STATES PATENT AND TRADEMARK OFFICE
CERTIFICATE OF CORRECTION

PATENT NO. : 4,762,986
DATED : August 9, 1988
INVENTOR(S) : Hirofumi Suda et al.

It is certified that error appears in the above-identified patent and that said Letters Patent is hereby corrected as shown below:

Title Page

Insert -- [30] Foreign Application Priority Dates
  March 10, 1986 [JP] Japan...60-051834
  March 10, 1986 [JP] Japan...60-051835
  March 10, 1986 [JP] Japan...60-051836
  March 10, 1986 [JP] Japan...60-051837 --

Signed and Sealed this

Twentieth Day of December, 1988

*Attest:*

DONALD J. QUIGG

*Attesting Officer*     *Commissioner of Patents and Trademarks*